Patented July 8, 1947

2,423,556

UNITED STATES PATENT OFFICE 2,423,556

HYGROSCOPIC LIQUID COMPOSITION AND THE PROCESS OF SOFTENING PAPER WITH SAID COMPOSITION

Richard Feibelmann, New York, N. Y., assignor, by mesne assignments, to Heyden Chemical Corporation, New York, N. Y., a corporation of Delaware No Drawing. Application April 17, 1943, Serial No. 483,494

6 Claims. (Cl. 106—287)

This invention relates to compounds of urea, and involves new and useful addition or coordination compounds of urea with certain salts of organic or weak inorganic acids. In one of its more specific aspects the invention relates to compounds of urea and potassium formate.

Various compounds of urea and inorganic salts have been described or referred to in the literature. For instance, in Beilstein's Handbook of Organic Chemistry, there are listed many molecular addition or coordination compounds of urea with inorganic salts such as the ammonium, sodium, calcium, magnesium and copper halides, silver and manganese nitrates, and other metal salts of strong inorganic acids. But so far as I am aware, no molecular compounds with salts of organic or weak inorganic acids were known or had been described prior to my present invention.

I have found that urea associates with certain salts of weak acids, and that complex products are produced which have unexpected and valuable qualities. Such complex products are referred to herein and in the claims as compounds, although it is to be understood that they may be only addition or coordination compounds which are readily dissociated into their individual constituents. These compounds of urea and certain salts have different crystallization points and are generally more soluble than their individual constituents and the constituents appear to combine in certain well-defined molecular ratios to produce the compounds.

The salts I have used for preparing these compounds or complex products of urea include both salts of organic and weak inorganic acids; for instance, formates, acetates, propionates and sulfamates. Certain of these specific compounds are referred to hereinafter.

The compound of urea and potassium formate in the molecular ratio of one molecule of urea to two molecules of potassium formate needs only 10% of water to form a solution that is stable at room temperature. This means that 100 parts of water can dissolve 900 parts of the said compound, which comprises 663 parts of potassium formate and 237 parts of urea, whereas potassium formate alone has a solubility of only about 330 parts in 100 parts of water, and urea is soluble in an equal weight of water, at room temperature.

One hundred (100) parts of the compound of urea and sodium acetate in the molecular ratio of two molecules of urea to one molecule of sodium acetate ($CH_3COONa \cdot 3H_2O$) forms a liquid when melted with 30 parts of acetamide and the melt remains liquid when cooled to room temperature. On the other hand, when 47 parts of urea or 53 parts of sodium acetate are separately melted together with 30 grams of acetamide, crystallization of the melt takes place on cooling.

The compound of urea and ammonium sulfamate in the molecular ratio of one molecule of urea to two molecules of ammonium sulfamate is easily soluble in glycerin, while ammonium sulfamate alone is not.

The new compounds of my invention are not only easily soluble in water, but their concentrated solutions are solvents for other substances, which is quite surprising. For instance, the compound of urea and potassium formate in the molecular ratio of one molecule of urea to two molecules of potassium formate, liquefies with 10% by weight of water, is miscible with methanol, ethyl alcohol, glycol, diethylene glycol, formaldehyde, and substances like glucose and other sugars, pentaerythritol, phenol, dextrine, ethanolamines, formamide, acetamide, gelatin, and many others. Gelatin and glue solutions are prevented from gelatinizing by adding these compounds thereto, to an extent which is dependent upon the proportion of the new compounds which are added to the gelatin or glue. Cellulose, starch, gums and related substances swell in contact with these compounds, an effect which is a stage preliminary to solution.

Solutions of these new compounds in water have an unusually high capillary activity and penetrate capillaries easily. They are therefore good impregnating agents for various purposes, for instance, for wood, paper, leather, textiles, and the like, in order to impart desirable properties such as weight, flexibility, softness, hygroscopicity, fire-proofness, etc., to such objects.

Some of the new compounds are very effective hygroscopic agents, when used in the form of their concentrated aqueous solutions, and so may be used as substitutes for glycerin, so far as hygroscopicity is concerned. In this respect they are superior to glycerin, the prototype of hygroscopic liquids.

In preparing my new compounds, I can proceed in various ways. The constituents may be melted together, or solutions of the individual constituents may be mixed; or urea may be added to a more or less concentrated solution of the selected salt; or the salt may be added to a more or less concentrated urea solution; or urea and an acid whose salt is to be a constituent of the compound may be mixed and the batch neutralized subsequently with a hydroxide or a carbonate of the metal whose salt is the selected constituent of the compound, such as a hydroxide or carbonate of sodium, potassium, ammonium, calcium, magnesium, etc. It is not necessary that the constituents be in molecular ratios, as one or the other may be in excess.

Examples of compounds of my invention and methods of preparing them are as follows:

*Example 1.*—One hundred twenty (120) parts (2 mols) of urea and 136 parts (1 mol) of crystallized sodium acetate $CH_3COONa \cdot 3H_2O$ are melted together. The melted batch forms a clear heavy liquid which has a great tendency to supercool. It stays liquid for a long time if it is not disturbed. After solidifying, it forms a crystallized product which has a crystallization point of 33° C.

*Example 2.*—One hundred eighty (180) parts (3 mols) of urea are added to the solution of 168 parts (2 mols) of potassium formate (HCOOK) in 50 parts of water, and the water is then evaporated. The resulting compound has a crystallization point of 58° C.

*Example 3.*—One hundred ten (110) parts of formic acid of 85% strength (slightly in excess of 2 molecular equivalents) are neutralized with potassium carbonate or caustic potash, and then 60 parts of urea (1 molecular equivalent) are dissolved in this concentrated potassium formate solution. After cooling to room temperature the product, which consists of approximately 60 parts of urea, 171 parts of potassium formate and 35 parts of water, remains liquid. The crystallization point of the product is about 56° C., when freed from water.

*Example 4.*—Two hundred twenty-eight (228) parts (2 mols) of ammonium sulfamate

$(NH_4OSO_2NH_2)$ are melted, and then 60 parts (1 mol) of urea are added, which are easily dissolved. The resulting compound has a great tendency to supercool, and forms, after solidifying, a hard product, whose crystallization point is 102° C. It is very easily soluble in water.

*Example 5.*—One hundred eighty-two (182) parts of an aqueous 50% solution of lactic acid (approximately 1 molecular equivalent) are neutralized with 69 parts of calcined potassium carbonate (approximately 0.5 molecular equivalent) and then 30 to 60 parts of urea are added. The urea dissolves easily in the solution of potassium lactate. The solution is evaporated until a viscous syrupy product is obtained. The product does not crystallize and is useful as a plasticizer and as an ingredient in printing pastes.

*Example 6.*—Eighty-eight (88) parts (½ mol) of crystallized calcium acetate

$(Ca(OOCCH_3)_2 \cdot H_2O)$ are dissolved in 250 parts of water. After the addition of 60 parts (1 mol) of urea, the water is evaporated. The remaining dry compound can be powdered, and is a stable product, much easier soluble in water than calcium acetate alone.

The compounds of the present invention may be used for impregnating materials either in order to increase the weight, or to influence the moisture content, the softness, the pliability, absorbency, etc. For these purposes, the compounds may be applied as solutions, either in water or in other substances, as may be suitable, or the compounds may be applied in highly concentrated liquid form. For instance, 1 part of the urea-sodium acetate compound in the molecular ratio of 2 mols of urea to 2 mols of sodium acetate is soluble in 1 part of hot glycerin. This solution remains liquid at room temperature. Instead of glycerin, the same amount of corn syrup may be used with the same result. When glycerin is replaced by acetamide, even as little as one-third part of this substance keeps the urea-sodium acetate compound liquid. One part of the urea-potassium formate compound in the molecular ratio of 3 mols of urea to 2 mols of potassium formate forms a stable heavy hygroscopic liquid with 1 part of diethylene glycol. One part of the urea-potassium formate compound may be dissolved together with 1 part of potassium formate, one half part of corn syrup and one fifth part of water by applying heat. The resulting solution is a heavy liquid that is stable at room temperature. Or 7 parts of urea, 5 parts of crystallized sodium acetate, 2.5 parts of potassium formate, and 10 parts of corn syrup may be melted together in order to form a stable liquid. The urea-potassium formate compound in the molecular ratio of 1 mol of urea to 2 mols of potassium formate forms a stable liquid with as little as 10 to 12% of water.

The possibilities of producing stable highly concentrated liquids from the described and other urea-salt compounds are almost unlimited. The adaptability to special purposes is great.

Textile fabrics may be impregnated with any one of the described compounds or solutions in order to produce a heavy weight finish. The compounds of urea and sodium acetate will produce a dry feel, while the compounds of urea and potassium formate will impart hygroscopicity to the fabric. The impregnated textile fabrics show great resistance to inflammability. The compounds of urea and potassium formate may also be used as hygroscopic agents in printing pastes. Paper that has been impregnated with the hygroscopic compounds acquires a high degree of non-inflammability, softness and pliability; also the water absorbency is considerably increased. Leather also is softened by these new urea-salt compounds; wood is made more pliable. The degree of the weighting and softening, etc., naturally is dependent on the quantity of the compounds. The expert will be able, after a few trials, to determine the necessary amount, concentration, and the kind of solvent to be used.

The new compounds, especially the compounds of urea and potassium formate, possess a great ability to penetrate capillaries. This property is important where the new compounds are to be used in impregnating compositions and also in embalming fluids.

The new compounds also have a liquefying effect on starch as well as on gums. For instance, 1 pound of potato starch dispersed in 2 gallons of water and heated with live steam while stirring, will result in a thick paste. If 1 ounce of a urea-potassium formate or urea-potassium acetate compound is present during the boiling, a liquid solubilized starch is obtained after boiling for 15 minutes. Gum tragacanth or Karaya gum dispersed in 30 parts of a solution of the urea-potassium acetate compound in acetamide (2:1) swells in a short time to form a very viscous mass.

The new compounds prevent gelatin solutions from gelatinizing. For instance: 250 parts of a 10% hot solution of gelatin in water remains liquid on cooling, if 10 parts of the urea-potassium formate compound are added; 250 parts of a 25% gelatin solution remains liquid with 20 parts of the same compound; even a 40% gelatin solution can be kept liquid at room temperature with 40% of its weight of the said compound. If 1 part of powdered gelatin is added to a solution of 1 part of the same urea compound in 1 part of water and the batch stirred, a viscous liquid is formed.

Kraft paper impregnated with a 20% solution of one of the described compounds and dried, will not burn with a flame; it only glows, forming a black ash. The same appearance is shown by wood when impregnated with a 20% solution of these compounds. Wood becomes more pliable after impregnation with any of the new compounds.

For many purposes a mixture of the products of two or more of the examples gives superior results.

Having thus described my invention, what I claim as new and desire to secure by Letters Patent is:

1. A composition consisting essentially of urea and potassium formate in a molecular ratio within the range of approximately 2 to approximately 6 mols of potassium formate to each 3 mols of urea.

2. A composition consisting essentially of urea and potassium formate in which the molecular ratio of these two constituents to each other is approximately 3 mols of urea to 2 mols of potassium formate, said composition, when free from water, having a crystallization point of approximately 58° C.

3. A composition consisting essentially of urea and potassium formate in which the molecular ratio of these two constituents to each other is approximately 1 mol of urea to 2 mols of potassium formate, said composition, when free from water, having a crystallization point of approximately 56° C.

4. A normally liquid hygroscopic composition consisting essentially of approximately 60 parts by weight of urea, approximately 171 parts by weight of potassium formate and approximately 35 parts by weight of water.

5. A process for softening paper which comprises impregnating said paper with an aqueous solution containing not more than approximately 20% by weight of a composition consisting essentially of urea and potassium formate in a molecular ratio within the range of approximately 2 to approximately 6 mols of potassium formate to each 3 mols of urea and thereafter drying said paper.

6. A hygroscopic liquid composition suitable for use as a substitute for glycerol which consists essentially of urea and potassium formate in a molecular ratio within the range of approximately 2 to approximately 6 mols of potassium formate to each 3 mols of urea together with at least approximately 10% by weight of water.

RICHARD FEIBELMANN.

REFERENCES CITED

The following references are of record in the file of this patent:

UNITED STATES PATENTS

| Number | Name | Date |
|---|---|---|
| 1,040,665 | Gruter | Oct. 8, 1912 |
| 1,979,121 | Rotta | Oct. 30, 1934 |
| 2,290,503 | Stuewer | July 21, 1942 |
| 2,265,144 | Christopher et al. | Dec. 9, 1941 |
| 2,183,736 | Bauer | Dec. 19, 1939 |
| 2,215,846 | Bauer | Sept. 24, 1940 |
| 1,867,658 | Dreyfus | July 19, 1932 |
| 2,212,152 | Cupery | Aug. 20, 1940 |
| 2,281,599 | Morgan | May 8, 1942 |
| 2,268,674 | Roth | Jan. 6, 1942 |
| 2,183,711 | De Witt | Dec. 19, 1939 |